United States Patent [19]

Stevens

[11] 4,405,140
[45] Sep. 20, 1983

[54] BOBSLED

[75] Inventor: David B. Stevens, Oconomowoc Lake Village, Wis.

[73] Assignee: Excalibur Automobile Corporation, West Allis, Wis.

[21] Appl. No.: 359,123

[22] Filed: Mar. 17, 1982

Related U.S. Application Data

[63] Continuation-in-part of Ser. No. 179,012, Aug. 18, 1980, Pat. No. 4,348,033.

[30] Foreign Application Priority Data

Aug. 29, 1979 [GB] United Kingdom ................. 7929979

[51] Int. Cl.³ ............................................ B62B 13/08
[52] U.S. Cl. ......................................... 280/16; 280/91
[58] Field of Search ................... 280/15, 16, 17, 21 R, 280/21 A; 180/150, 182, 183, 190

[56] References Cited

U.S. PATENT DOCUMENTS

| 305,101 | 9/1884 | Mullrey | 280/16 |
|---|---|---|---|
| 1,546,805 | 7/1925 | St. Pierre | 280/16 |
| 1,618,094 | 2/1927 | King | 280/99 |
| 2,276,310 | 3/1942 | James | 180/182 |
| 2,440,785 | 5/1948 | Porter | 180/188 |
| 2,442,918 | 6/1948 | Caughrean | 280/15 |
| 2,592,116 | 4/1952 | Caughrean | 280/15 |
| 2,700,427 | 1/1955 | Schomers | 280/182 |
| 3,055,675 | 9/1962 | Brecko et al. | 280/91 |
| 3,057,633 | 10/1962 | Brousseau | 280/16 |
| 3,392,987 | 7/1968 | Muller et al. | 280/91 |

FOREIGN PATENT DOCUMENTS

| 54074 | 3/1912 | Austria | 280/16 |
|---|---|---|---|
| 462437 | 1/1950 | Canada . | |
| 516218 | 12/1930 | Fed. Rep. of Germany . | |
| 1513533 | 1/1967 | France . | |
| 1566429 | 2/1968 | France . | |
| 2166466 | 8/1973 | France . | |
| 165004 | 10/1933 | Switzerland . | |

Primary Examiner—David M. Mitchell
Assistant Examiner—Timothy Roesch
Attorney, Agent, or Firm—Quarles & Brady

[57] ABSTRACT

An improved steering linkage (31, 36–42, 45, 46, 49, 50, 83, 84, 86, 87, 95, 96) for four runner steering of a bobsled (10) employs sheathed cables (83 and 84) coupled between bell cranks (45 and 46) and the right front and rear runner assemblies (22 and 23). The steering system extends through the front and rear axles (68 and 69) which are coupled to the frame (12) through a suspension system. The cables 83 and 84 slide when steering system is actuated, but are not displaced by movement of their supporting sheaths. The cables (83 and 84) also have a small amount of slack, which allows the runner assemblies (22 and 23) to be displaced vertically in a banked turn without adversely affecting the steering of the sled (10).

4 Claims, 12 Drawing Figures

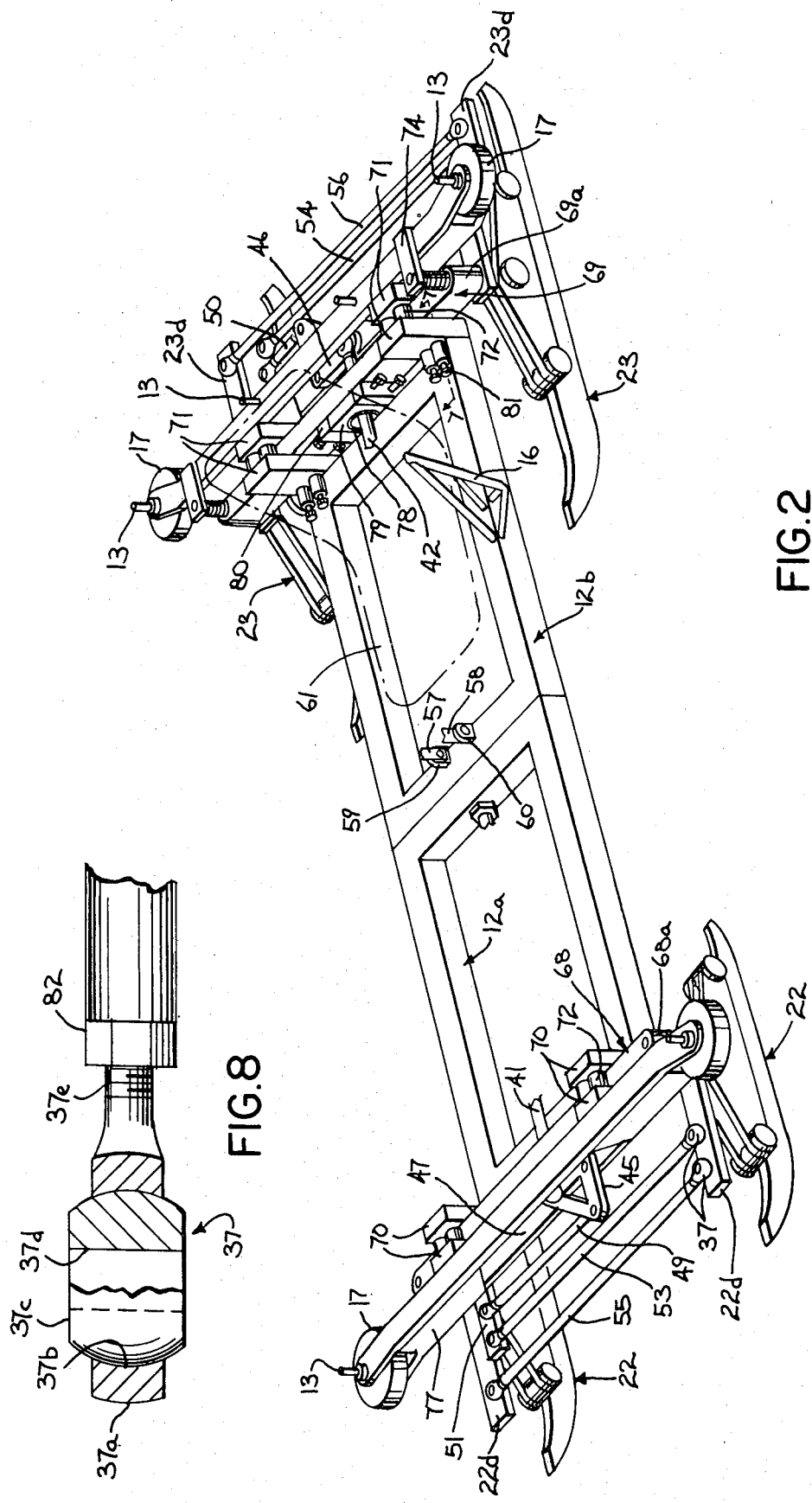

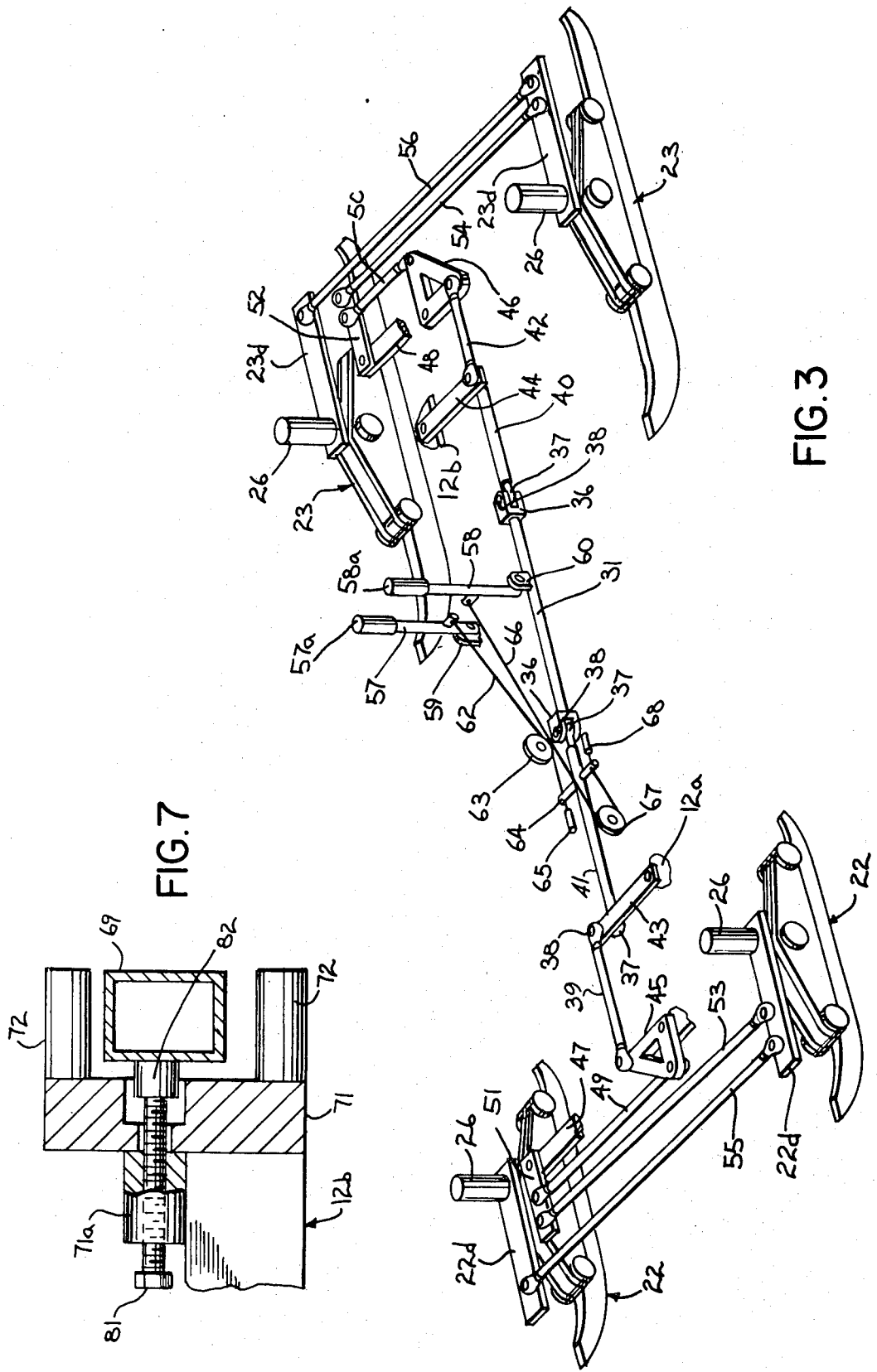

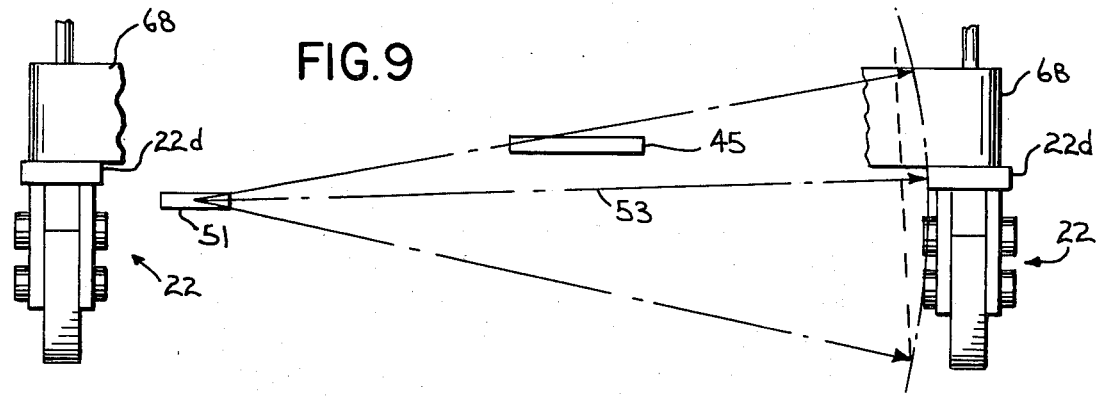
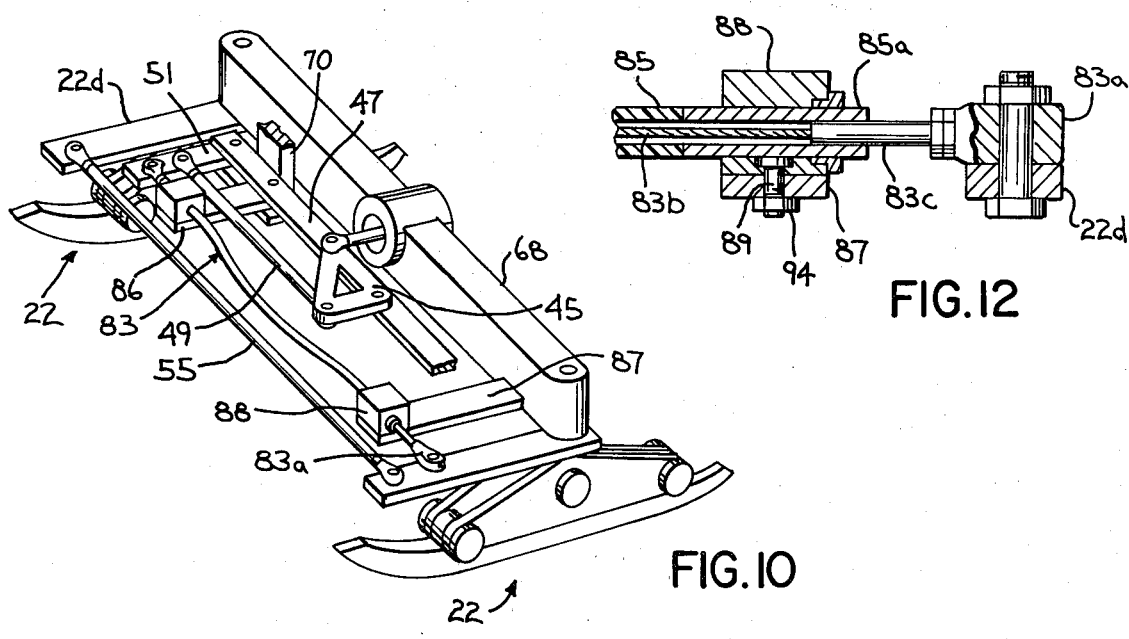
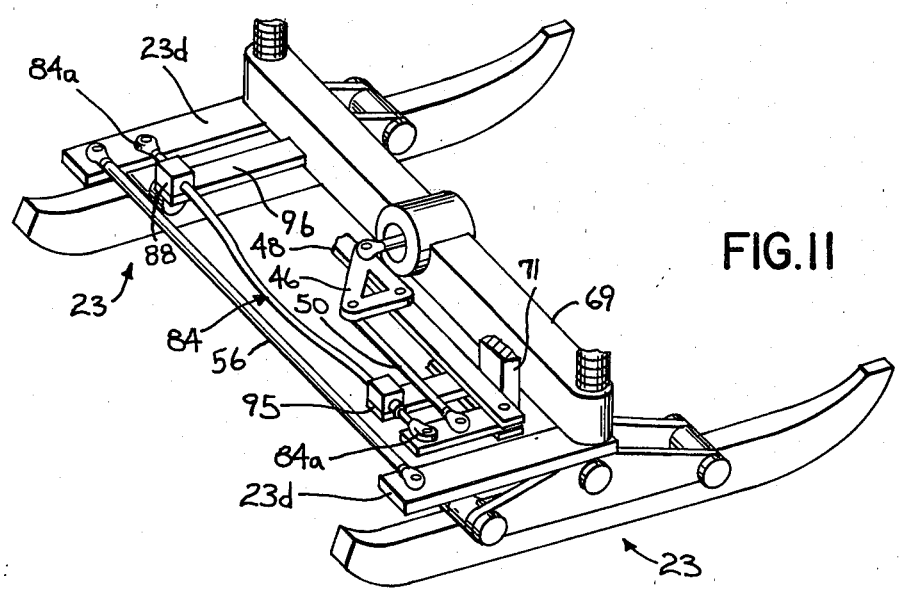

BOBSLED

CROSS-REFERENCE TO RELATED APPLICATION

This is a continuation-in-part of the copending U.S. patent application, Ser. No. 179,012 filed Aug. 18, 1980. Now U.S. Pat. No. 4,348,033.

TECHNICAL FIELD

The field of the invention is vehicles of the type mounted on runners and used for carrying people and loads over ice and snow, and more particularly, racing sleds of the type used in international competition.

BACKGROUND ART

In recent years, many bobsleds used in international competition have been manufactured in Italy. Bobsled teams from other countries have found it convenient to purchase these bobsleds and make aerodynamic and engineering changes, rather than to engage in the development of an entirely new bobsled. An exception to this approach was exemplified by the East German sleds that were used in the 1980 Olympic competition. The success of the East Germans was due to technological improvements, including better aerodynamic design and an independent suspension, coupled with superior driver skills. Other developments in bobsled technology have been provided in the area of the runners. There has not been, however, comparable development of the steering and control system which melds the driver to his sled. Generally, bobsleds have included controls for the front runners only, with the brakeman being required to skid or jump the rear end of the sled laterally in the turns to direct the rear runners in following the general path of the front runners. The physical connections to the front runners have been made through a pair of hand ropes, one being held in the right hand of the driver and the other being held in the left hand. The front runners have been mounted on an H-shaped frame that is supported at its geometrical center to pivot right or left in the horizontal plane, as well as up and down in a plane transverse to the longitudinal axis of the sled. The rear runners have also been connected to an H-shaped frame supported at its geometrical center, however, this frame has not been connected to the steering ropes.

With such a control system, the rear runners may skid or edge causing loss of speed. Nor is it possible to reach, or approach, an ideal steering position wherein the rear runners track on a thin film of water left by the track of the front runners. With a steering system such as described, it is possible that one of the hand ropes could be dropped during a run, and would then be very difficult to retrieve.

Racing bobsleds have not typically incorporated suspension systems, which in some respects, is advantageous in racing. With a more sophisticated suspension system and an improved steering system, it is possible to expand the sort of bobsledding to a concession operation in which non-competitors can experience a bobsled run on a course of the type used for international competition.

A technical problem in adding a suspension system to a bobsled is maintaining the independence of operation between the suspension system and the steering system. Otherwise, an element of self-steering may be introduced due to the reaction of the suspension system to conditions encountered during a bobsled run and the coupling of this reaction to the steering system. Self-steering effects require extra steering action by the driver, and the addition of a suspension system may offset some of the advantage of an improved steering system unless self-steering effects can be prevented.

DISCLOSURE OF THE INVENTION

The invention relates to a steering and control system through which a driver can control and direct both the front and rear runners of his bobsled.

As disclosed in the related application, the bobsled has a steering linkage through which a pair of rear runner assemblies are pivoted counter to the front runner assemblies in a turning maneuver. This bobsled also has a pair of lever type controls, or "joy sticks," which are located directly ahead of the driver's seat for actuating the steering linkage to effect the simultaneous steering of the front and rear runners, and a suspension system that is built compactly around the four-runner steering system to improve the handling characteristics of the sled.

As further explained in the related application, this bobsled more particularly includes a frame, a front and a rear axle coupled to the frame through the suspension, two front runner assemblies linked together and each pivotally connected to a respective end of the front axle, and two rear runner assemblies linked together and each pivotally connected to a respective end of the rear axle. A front steering motion translator and a rear steering motion translator are coupled together by a steering linkage, and this structure is carried by the frame.

The isolation of the steering system and the suspension system can be improved, over the embodiments shown in the related application, by providing a sheathed cable with rigid end portions to connect each steering motion translator to one of the runner assemblies at its end of the bobsled. The sheath is supported between coupled connections to the frame and to the axle at each respective end of the bobsled. With the sheathed cables in the steering linkage, the displacement of the axles relative to the frame will not induce self-steering of the runners. Each sheathed cable is slightly longer than necessary when the runners are at normal elevation, and the slack allows the runners to be vertically displaced, and the cable to be extended slightly, without pulling the runners to one side or the other.

The accompanying drawings, which are incorporated herein, show the embodiment of the bobsled in the related application as well as the improved arrangement of the steering control linkage. To the extent that any of the disclosure of copending Ser. No. 179,012 is not repeated herein, it is incorportated by reference.

BRIEF DESCRIPTION OF THE DRAWINGS

FIG. 2 is a perspective view of the bobsled as described in the related application with the body and steering actuation components removed to permit better viewing of the frame and suspension;

FIG. 3 is a diagrammatic view in perspective that illustrates the steering and control systemm of the bobsled of FIG. 2;

FIG. 7 is a sectional view showing one of the damper mechanisms as seen in the plane indicated by line 7—7 in FIG. 2;

FIG. 8 is a side view in elevation of one of the spherical cam joints in FIG. 3;

FIG. 9 is a schematic view of the front end of the bobsled of FIG. 1 in elevation;

FIG. 10 is a fragmentary view, in perspective, of the front end of the bobsled showing the improved linkage coupled to the front runner assemblies;

FIG. 11 is a fragmentary view, in perspective, of the rear end of the bobsled, showing the improved linkage coupled to the rear runner assemblies; and FIG. 12 is a detail section view of one end of one of the sheathed cables and its connection to one of the runner assemblies.

BEST MODE OF CARRYING OUT THE INVENTION

Figure 1:
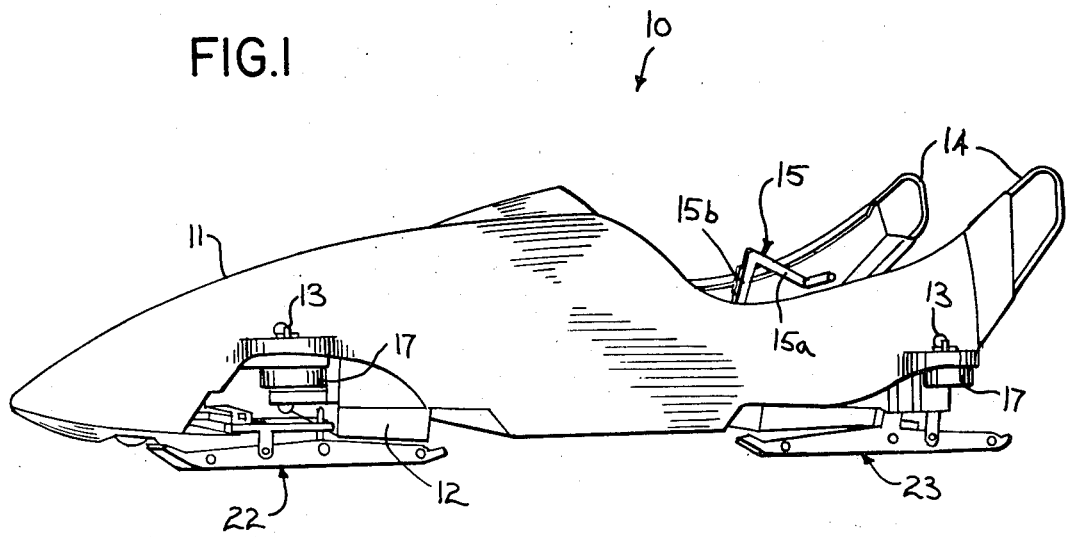
FIG. 1 is a perspective view of a bobsled that embodies the present invention.

Referring to FIG. 1, the bobsled 10 that incorporates the present invention has a fiberglass body 11 of sleek, aerodynamic design. The body 11 is mounted on a frame 12 seen in FIG. 2 and is held down on the front and rear of the frame 12 and the members supported therein, as seen in FIGS. 1 and 2, by pin-style fasteners 13 of the type used to hold down the hoods of automobiles. Referring specifically to FIG. 1, the body 11 is formed around a pair of handles 14, which are located at the rear of the bobsled 10, and which are gripped by the members of the bobsled team to rock the bobsled 10 back and forth prior to a run down the course. A pusher bar 15 is seen in its raised position, where its arm 15a extends outside the left side of the body 11 when the sled 10 is pushed to start a run. The pusher bar 15 also has a shaft 15b that is telescoped into a sleeve 16 mounted on a rear frame section 12b as seen in FIG. 2. The pusher bar 15 is rotated into a position where it can slide down into the sleeve 16 and inside the left side of the body 11 after the start has been accomplished.

A portion of the body has been cut away in FIG. 1 to show two plastic discs 17 that are rotatably supported on the frame and which protrude from the edges of the body 11 to protect the front and rear ends of the sled from bumping the sidewall along a bobsled course. Two more of these discs 17 are located on the other side of the sled 10 as well, as seen in FIG. 2. When a run has been completed, the sled is braked with a mechanism seen in FIG. 6. The brake mechanism includes a brake lever 18 pivotally mounted on the rear frame section 12b and connected through a cable 19 and pulley 20 to a pivotable brake spud 21 that digs into the ice to prevent the sled 10 from sliding backward.

Figure 6:
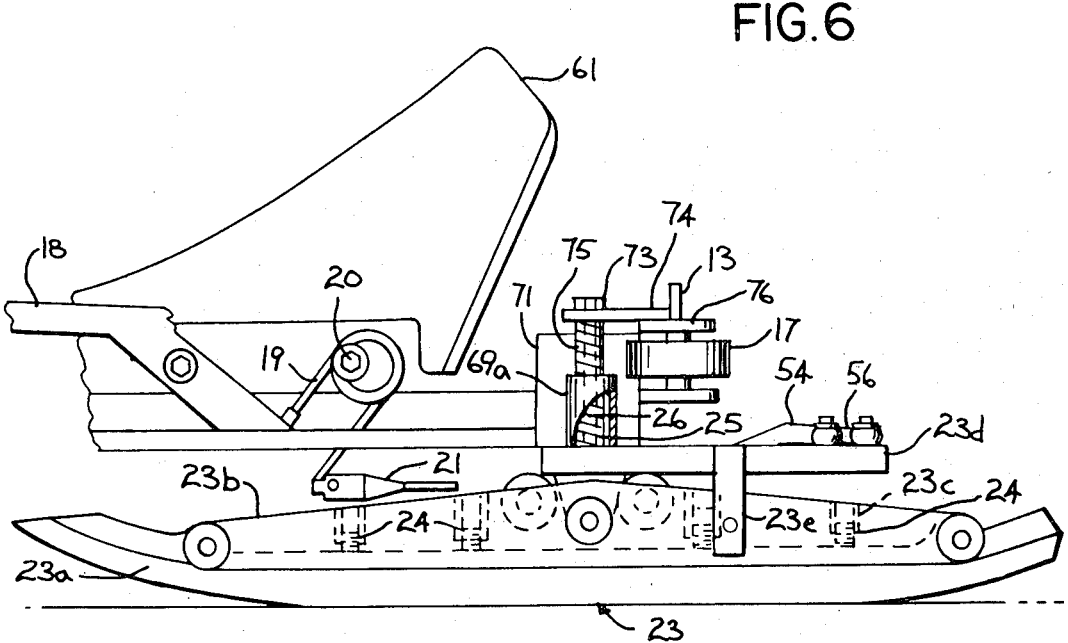
FIG. 6 is a detail side view in elevation of a runner assembly of the bobsled of FIG. 1.

As seen in FIGS. 2 and 3, the frame 12 is carried on two front runner assemblies 22 and two rear runner assemblies 23. As seen in FIG. 6, each runner assembly carries a flexible runner blade 23a with a web that is pivotally connected to a runner support 23b just behind the forward tip and just in front of the rear tip of the runner blade 23a. The runner support 23b has two laterally spaced side flanges joined by four webs 23c in which threaded holes are formed to receive set screws 24. The set screws 24 bear against the runner blade 23a, holding it in a more arcuate position as they are projected further out of the blade support 23b, and allowing the runner blade 23a to assume a flatter position when withdrawn into the blade support 23b. The amount of blade 23a that contacts the ice is determined by the flatness or the roundness of blade position is important to the performance of the bobsled.

Still referring to FIG. 6, the runner blade support 23b is pivotally connected to a runner pivot arm 23d along an axis transverse to the longitudinal axis of the bobsled 10 to allow the runner assembly 23 to rock forward and backward against a spring 25 as the sled 10 goes over bumps. The runner blade support 23b is also connected to the pivot arm 23d at a distance from the kingpin 26, by a pair of spaced, vertial link plates 23e, so that the runner assembly 23 is pivoted as a unit when the arm 23d is pivoted around the kingpin 26. The forward runner assemblies 22 of FIGS. 1-3 and 10-11 are constructed the same as the rear runner assemblies 23 just described, except that their pivot arms 22d and vertical link plates are forward of their respective kingpins 26 rather than rearward as with the pivot arms 23d and link plates 23e of the rear runner assemblies 23.

Figure 4:
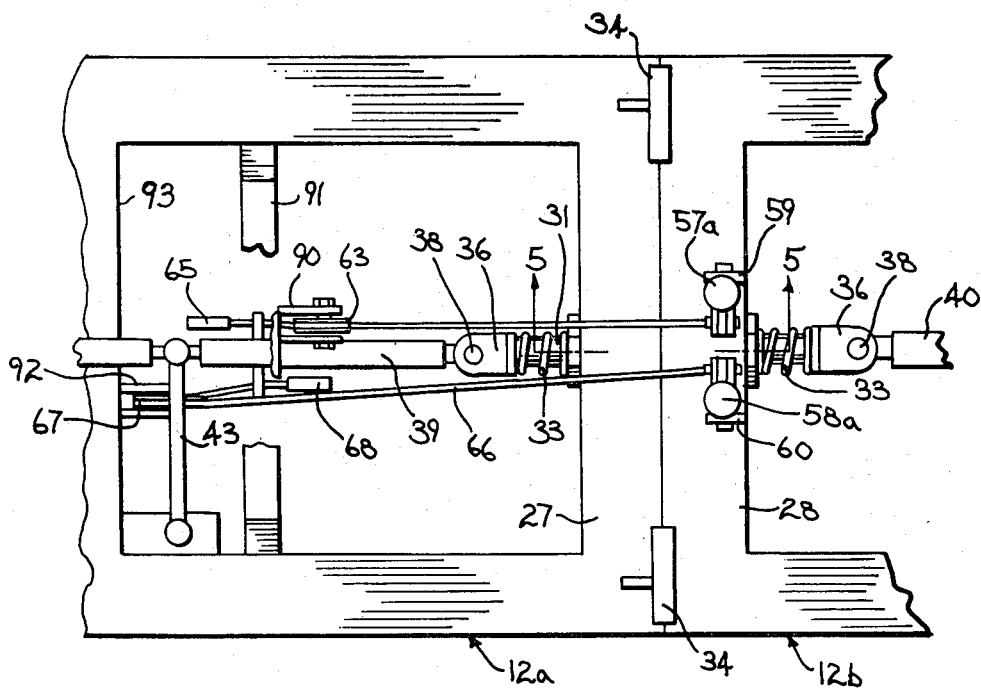
FIG. 4 is a top fragmentary view showing the center section of the frame and steering control system of the bobsled of FIG. 3.
Figure 5:
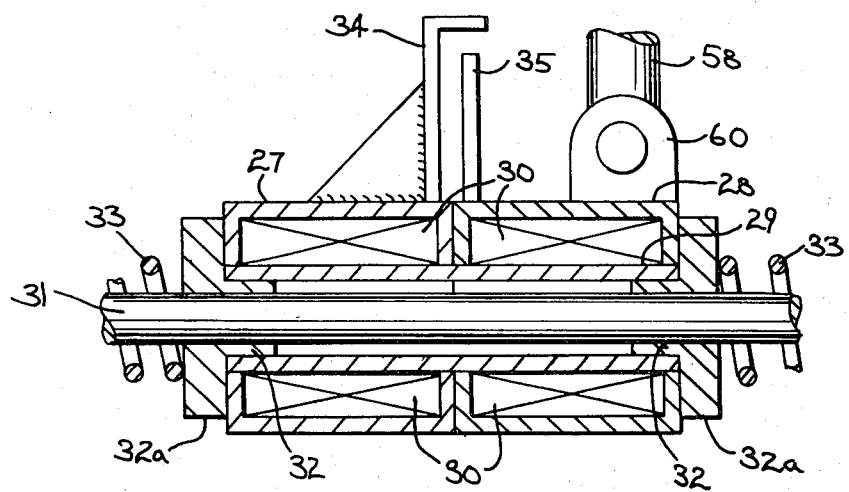
FIG. 5 is a sectional view taken in the plane indicated by line 5—5 in FIG. 4.

Referring to FIG. 2, where a belly pan (not shown) and the body 11 have been removed, the front and rear rectangular sections 12a and 12b of the frame are formed of either box steel or channel steel members welded together, the style of members in the two sections 12a and 12b being optional depending on design considerations such as weight and balance. Referring to FIGS. 4 and 5, the front and rear frame sections 12a and 12b are articulately connected for independent swiveling motion around a central longitudinal axis. The center cross members 27 and 28 of the frame sections 12a and 12b rotate around a sleeve 29 on bearings 30 disposed in hollow portions of the members 28 and 29 and encircling the sleeve 29. The sleeve 29 extends through a bore along the longitudinal axis of the bobsled 10. A center-link steering actuator shaft 31 is carried in the bore of the sleeve 29 by a pair of bronze bushings 32. The bushings 32 include flanges 32a which are held against appropriate outside surfaces of the cross members 28 andd 29 by springs 33 carried by the steering actuator shaft 31.

The angular articulation of the frame sections 12a and 12b is limited by the further structure seen in FIG. 5. A plate 34 of L-shaped cross section with a triangular supporting flange is welded to the central cross member 27 of the front frame section 12a. This plate 34 forms a stop for an upright plate 35 which includes a triangular support flange and which is welded to the central cross member 29 of the rear frame section 12b. The vertical movement of the plate 35 is restricted by the stop plate 34 to limit the angular displacement of the rear frame section 12b to ten degrees of rotation from the plane of the front section 12a.

As seen in FIG. 3, the center-link steering actuator shaft 31 is coupled at its forward end to a first intermediate actuator link 39 and at its rear end to a second intermediate actuator link 40. Referring also to FIG. 4, each of these connections is made through a clevis 36 and a spherical ball joint 37, which are coupled by a pin 38. The steering linkage in FIG. 3 contains about twenty of these joints 37, which provide limited pivotal movement of the pins 38 coupling the rigid members. The spherical ball joints 37 provide the steering linkage with the flexibility necessary to adjust to the articulated movement of the frame sections 12a and 12b, as well as to the movements of the runner assemblies 22 and 23 in a plane of rotation transverse to the longitudinal axis of the bobsled 10.

The intermediate actuator links 39 and 40 are connected to front and rear actuator links 41 and 42, respectively, through pins 38 which couple the front pair of axles 39 and 41 and rear pair of links 40 and 42 to respective idler arms 43 and 44. The front idler arm 43 is pivotally mounted on the front frame section 12a to the left side of the actuator linkage and extends to pivotal connection between a top joint 37 on the front link 41 and a bottom joint 37 on the connecting intermediate link 39. The rear idler arm 44 is pivotally mounted on the rear frame section 12b and extends to a similar connection to the rear actuator link 42 and its connecting intermediate link 40. The idler arms 43 and 44 assist in maintaining the axial position of links 39–42 when the steering linkage is subjected to torsional forces.

Front and rear bell cranks 45 and 46 are pivotally mounted on opposite sides of the axially disposed actuator linkage and each have a portion that extends from its pivot to connect to a spherical ball joint 37 at one end of the actuator linkage. The bell cranks 45 and 46 are mounted on cross bars 47 and 48 and positioned to the front and rear of the frame 12. A radial portion extending forwardly from the pivot of front bell crank 45 and a radial portion extending rearwardly from the pivot of the rear bell crank 46 connect through spherical ball joints 37 to a pair of first tie rods 49 and 50. The bell cranks 45 and 46 are rotated to translate linear motion along the longitudinal axis of the frame 12 into linear motion transverse and generally perpendicular to this axis.

As described in the related application, and without the improvement to be disclosed herein, the first tie rods 49 and 50 at both the front and rear of the sled are connected through spherical ball joints 37 to reaction arms 51 and 52, which are pivotally mounted on the cross bars 47 and 48 just inside the right runner assemblies 22 and 23. Second tie rods 53 and 54 at the front and rear link the reaction arms 51 and 52 to respective pivot arms 22d and 23d on the left runner assemblies 22 and 23. Third tie rods 55 and 56 at the front and rear link the pivot arms 22d and 23d of each respective pair of runner assemblies 22 and 23, all of these connections being made through spherical ball joints 37.

Still referring to FIG. 3, when the actuator linkage is moved rearwardly the front bell crank 45 will pivot clockwise and will pivot the front runner assemblies 22 in a clockwise direction as well. At the same time, the rear bell crank 46 will pivot counterclockwise, thereby pivoting the rear runner assemblies 23 counterclockwise about their kingpins 26. If the actuator linkage is moved in a forward direction, the forward runner assemblies 22 will pivot in the counterclockwise direction and the rear runner assemblies will pivot in a clockwise direction. This provides for the positioning of the runner assemblies 22 and 23 for an arcuate sweep in turning maneuvers, where the rear runner blades 23a will travel at least partially in the fresh tracks made by the front runner blades 22a. The rear runner blades 23a may then take advantage of the thin film of water created by the passing of the front runner blades 22a to reduce friction and maintain or increase speed down the run.

As seen in FIG. 3, the axial movement of the actuator linkage is controlled through a pair of control levers 57 and 58 pivotally mounted on brackets 59 and 60, which are positioned just forward of the seat 61 (in phantom in FIG. 2) for the driver and brakeman. Each of the control levers 57 and 58 has a bicycle grip 57a and 58a on its uppermost end. A cable 62 is strung from a connection that is an appreciable radial distance from the pivot of the right-hand lever 57. The cable 62 is strung over a pulley 63, which maintains the alignment of the cable 62 between the lever 57 and an end of a stub shaft 64 that extends transversely through the intermediate actuator link 39. The cable 62 slides through a hole (not seen) in the right end of the shaft 64 and has an anchoring sleeve 65 on its free end to engage the stub shaft 64 when the right-hand lever 57 is pulled. A second cable 66 is similarly connected to the left-hand lever 58 but is then strung over a reversing pulley 67 and passes through the stub shaft 64 from the front, the calbe 66 having an anchoring sleeve 68 attached just behind the stub shaft 64. As seen in FIG. 4, the first pulley 63 is mounted by a bracket 90 on an intermediate cross member 92 of the front frame section 12a. The second pulley 67 is mounted on a bracket on the front cross member 93 of the front frame section 12a.

With the control levers 57 and 58 connected as described above, the pivoting or pulling of the right-hand control lever 57 towards the rear of the sled 10 will move the actuator linkage axially rearward. The pivoting or pulling of the left-hand control lever towards the rear of the sled 10 will move the actuator linkage axially forward due to the reversing connection through pulley 66. When one of the levers 57 or 58, or "joy sticks" as they are sometimes called, is pulled, the movement of the actuator linkage will tend to pivot the other lever 57 or 58 forward, thereby providing a push-pull mode of operation. This push-pull operation further provides a feel of rotation to the driver which corresponds to the direction of rotation of the front runner assemblies 22.

The control levers 57 and 58 are pulled against the operating forces provided by the springs 33 encircling the center link shaft 31 in FIG. 4. The purpose of these springs 33 is to bring the actuator linkage back to a "neutral" position where the runner assemblies 22 and 23 are pointed straight ahead and parallel to the longitudinal axis of the sled 10. The bobsled 10 will find a path down the course if the runners are allowed to maintain the straight ahead position. The purpose of steering control is to allow the driver to take a faster path down the course, albeit a riskier one. If the driver's grip on the levers 59 and 60 is momentarily lost during a run, the control levers 59 and 60 are much easier to regrasp than the steering ropes of prior bobsleds. And, the spring return of the steering linkage to a "neutral" position will bring the control levers 59 and 60 to an upright position where they can be regrasped.

The handling of the bobsled 10 is enhanced by the provision of a suspension system carried by the frame 12 and built around the steering and control sytem. As seen in FIG. 2, front and rear axles 68 and 69 are carried between pairs of axle guide plates 70 and 71, each axle 69 being positioned in spaces between the guide plates 70 and 71 to move upward and downward. The guide plates 70 and 71 are mounted on opposite ends of the frame 12 and provide support for the cross bars 47 and 48 on which the bell cranks 45 and 46 are mounted. Cylindrical bumpers 72 of elastomeric material bridge the space between the guide plates 70 and 71 to cushion and limit the upward movement of the axles 68 and 69. Similar bumpers 72 may be provided across the bottom of the axles 68 and 69 to cushion return downward movement. The axles 68 and 69 form cylindrical spring housings 68a and 69a at their ends, where springs 25 are received as seen in FIG. 6. The kingpins 26 extend through the center of the springs 25 and through the top of the housings 68a, where they are secured with locknuts 73 on the front axle 68. As seen in FIG. 6, the rear axle 69 has double the springing of the front axle 68, due to a 2:1 weight ratio between the load on the rear axle 69 and the load on the front axle 68. Additional springs 75 are mounted on top of the rear spring housings 69a and the rear kingpins 26 are extended through the housings 69a and hold down bars 74 and are fastened with locknuts 73. The hold-down bars 74 are mounted on a rear cross beam 76, which in turn is mounted on the rear cross bar and axle guide plates 71. A front cross beam 77 is similarly mounted on the front cross bar 47 and axle guide plates 70. The cross beams 76 and 77 carry the plastic discs 17 described above as well as the shank portions of the pin-style fasteners 13 for holding down the body 11 on the frame 12. These beams 76 and 77 each have a top flange, two webs on opposite sides of an opening for the actuator linkage, and two bottom flanges joined to the top flange by the webs.

Still referring to FIG. 2, the axles 68 and 69 are formed with annular flanges 78 that encircle openings in the axles 68 and 69 along the longitudinal axis of the sled 10, through which the front and rear actuator links extend. Rectangular collars 79 with circular openings are mounted on the circular flanges 78 and slide up and down between collar guide members 80 mounted to the extremities of the front and rear frame sections 12 and 12b. Damping is provided by pins 81 that are disposed in bores extending first through bosses 71a and then through the guide plates 70 and 71 and the collar guide members 80. The heads 82 on these pins 81, as seen in FIG. 8, have a coating of polytetrafluoroethylene and bear on the axles and on the sides of the collars to damp the response of the axles 68 and 69 to the action of the springs 25 and 75. Other suitable coatings may be provided on the heads 81 to reduce friction.

The result of this construction is that the axles 68 and 69 move vertically up and down as well as rotating about their annular flanges 78 up to a limit of ten degrees in a plane transverse to the sled axis. The spherical ball joints 37 provide for sufficient flexibility in the steering linkage to accommodate this movement. As seen in FIG. 8, each joint 37 includes a head 37a in which a race 37b is formed to receive a spherical ball 37c. The ball 37c has a bore for receiving a pin (not shown in FIG. 2) that pivots to a limit defined by the head 37a. The head 37a extends from a threaded shaft 37e that is screwed into a threaded bore in one end of the rigid member. Small adjusting nuts 82 are positioned on the threaded shaft 37e between the head 37a and the rigid member, so that linkage may be adjusted after the coupling pins are inserted. One particular joint suitable for this purpose is referred to as a Hime joint. Performance of the steering linkage is improved if diametrical clearance between the ball 37c and the race 37b is nearly zero, which can be accomplished where one or mmore sliding surfaces are coated with polytetrafluoroethylene or other friction-reducing material with similar properties.

This completes the description of the invention that was disclosed in the related application. An improvement to this construction has been made in the runner linkage as shown in FIGS. 10-12. The improvement is aimed at preventing a self-steering effect that is best understood by reference to FIG. 9. The problem occuurs when the left front runner 22 (seen on the right in FIG. 9) is moved to an elevation higher or lower than the right front runner 22 relative to the horizontal plane of the frame 12. This occurs in banked turns due to the motion of the front axle 68, which is coupled to the frame by the suspension described above, and which is allowed to pivot around the longitudinal axis of the sled 10 to a limited extent. When the axle is pivoted, the left end of the rod 53 (represented by the long arrow) will move in an arc relative to the reaction arm 51 which is mounted on the frame 12. When this occurs, the horizontal distance between the reaction arm 51 and pivot arm 22d is shortened as shown by the dashed chordal line in FIG. 9. This causes the front runners 22 to be pulled a small amount into the turn, while the rear runners 23 are pulled a small amount counter to the front runners 22. This small change can cause an amount of self-steering that requires compensation through steering action by the driver.

Referring to FIGS. 10 and 11, the improvement is made by employing flexible sheathed cables 83 and 84 rather than the tie rods 53 and 54, respectively. As seen in FIGS. 10 and 12, eyelets 83a are provided at the ends of the cable 83 for pivotable connections to the reaction arm 51 and pivot arm 22d, respectively. As seen in more detail in FIG. 12, the cable 83 has a flexible middle portion 83b carried within the flexible sheath 85. Rigid end portions 83c of the cable 83 extend out of rigid sleeves 85a on opposite ends of the sheath 85 and connect to eyelets 83a. The sleeve 85a of the sheath 85 that is adjacent to the reaction arm 51 is mounted on a sheath support arm 86, which is mounted on cross bar 47 to couple it to the frame 12. The sleeve 85a of the sheath 85 adjacent the left front runner assembly 22 is mounted on a second sheath support arm 87 mounted to and extending forwardly from the front axle 68. The sheath 85 and the cable 83 are longer than the distance between the pivot arms 22d, when the front runner assemblies 22 are at the same elevation relative to the frame. This allows a slight S-shape or bend in the sheathed cable 83 as viewed in the horizontal plane from the top or bottom.

The cables 83 and 84 which actuate the pivot arms 22d and 23d on the left runner assemblies 22 and 23, are isolated from the effects of axle movement as the suspension reacts to conditions on a bobsled course. The sheath 85 of the front cable 83 is attached to the frame 12 at one end and to the front axle 68 at its other end. The sheath 85 will extend and relax a small amount with the cable as the ends of the axle 68 move up and down relative to the frame 12. The cable 83, however, does not slide through the sheath 85 in response to the axle movement. As seen in FIG. 12, the sheath 85 is attached to each arrm 86 and 87 by a collar 88 having a pin 89 extending through members 86 and 87, respectively, to be secured by retainers 94 beneath.

Referring to FIG. 11, the rear sheathed cable 84, which is substituted for tie rod 54 at the rear end of the sled 10, is constructed in the manner described for the front cable 83 related to FIG. 12. Eyelets 84a pivotably connect the cable 84 at opposite ends to the reaction arm 52 and the left runner assembly pivot arm 23d. The sheath of cable 84 includes a sleeve 84a at one end that is attached to a sheath support arm 95 connected to cross bar 48. At the other end, this sheath has a sleeve (not shown) attached to an arm 96 extending rearwardly from the left end portion of the rear axle 69.

What has been described is a bobsled having an improved steering system for controlling both front and rear runners on a bobsled. Since many sleds might be designed incorporating the invention in different ways, and the above description has been by way of illustration, the scope of the invention shall be defined by the following claims.

The embodiments of the invention in which an exclusive property or privilege is claimed are defined as follows:

1. A bobsled which comprises:
   a frame;
   front and rear axles coupled to the frame through a suspension;
   two front runner assemblies linked together and each pivotably connected to a respective end of the front axle;
   two rear runner assemblies linked together and each pivotably connected to a respective end of the rear axle;
   a front steering motion translator and a rear steering motion translator coupled together by a steering linkage and carried by the frame; and
   front and rear steering control linkages each having a flexible middle portion carried in a flexible sheath and having rigid end portions extending out the opposite ends of the sheath, a first rigid end portion being connected to one of the runner assemblies at its corresponding end of the bobsled and the end of the sheath around the first rigid portion being coupled to the axle at the same end of the bobsled, the other rigid end portion of the sheathed member being coupled to the steering motion translator at the same end of the bobsled and the other end of the sheath being pivotably coupled to the frame, to allow the operation of each sheathed member in actuating the movement of its corresponding pair of runner assemblies to be independent of the displacement of the axle relative to the frame.

2. The bobsled of claim 1, wherein each sheathed member is longer than the shortest distance between its coupled connection to the steering motion translator and its connection to one of the runner assemblies at its corresponding end of the bobsled, so that each sheathed member may be extended in response to vertical displacement of its sheath and the axle coupled to it rather than actuating a steering movement of the runner assemblies.

3. The bobsled of claim 1 or 2, wherein each steering control linkage is a sheathed wire cable with rigid ends.

4. The bobsled of claim 1, wherein the rigid ends of the sheathed member that are pivotably coupled to the runner assemblies are adapted to pivot only in a plane parallel to the frame of the bobsled.

* * * * *